D. H. LAYNE.
COMPUTING YARD MEASURE.
APPLICATION FILED NOV. 9, 1910.
988,790.
Patented Apr. 4, 1911.
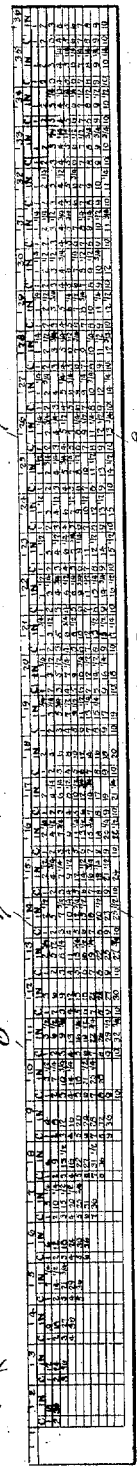
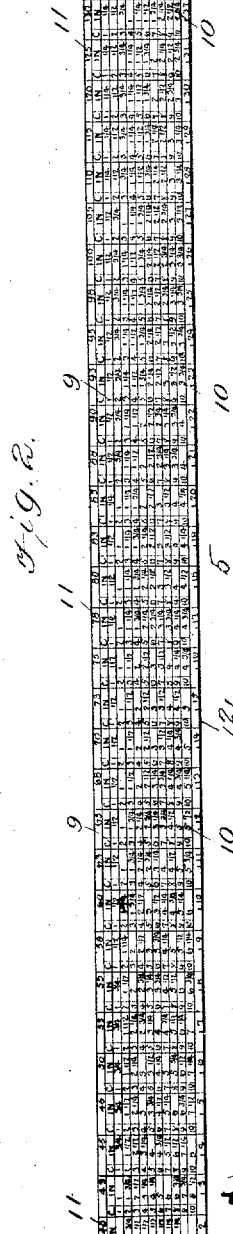
Witnesses
F.C. Barry
M. Rwidson
Inventor
David H. Layne
by Nils B. Stevens Co.
Attorneys

UNITED STATES PATENT OFFICE.

DAVID H. LAYNE, OF COVE, OREGON.

COMPUTING YARD-MEASURE.

988,790. Specification of Letters Patent. Patented Apr. 4, 1911.

Application filed November 9, 1910. Serial No. 591,488.

*To all whom it may concern:*

Be it known that I, DAVID H. LAYNE, a citizen of the United States, residing at Cove, in the county of Union and State of Oregon, have invented certain new and useful Improvements in Computing Yard-Measures, of which the following is a specification.

The object of the present invention is to provide a computing yard-measure embodying a novel arrangement of graduations and price columns, the graduations representing linear dimensions also indicating different price values.

In order that the invention may be better understood, reference is had to the accompanying drawing, forming a part of this specification, in which drawing—

Figure 1 is a plan view showing one side of the measure, and Fig. 2 is a plan view showing the other side.

The measure which is the subject of the present invention is indicated at 5, it being in the form of a yard-stick, which is constructed of wood, metal, composition, or any other suitable material. If desired, the measure may be secured to the store counter, it being designed more particularly for use in dry-goods stores.

One side of the stick is provided at one of its longitudinal edges with inch graduations 6, which also denote different price values. Below each graduation are two columns 7 and 8 of numerals extending transversely of the stick. The numerals 7 indicate different monetary values, and they are opposite the numerals 8, which latter indicate different quantities in inches. The numerals 7 represent different amounts in cents, the column being headed by the letter C. The column 8 is headed by the abbreviation "In." for "inches."

The quantities indicated by the numerals 8 are calculated according to the different monetary values expressed by the numerals 7, and on the basis of the price per yard indicated at the head of the columns by the inch graduations 6. Thus, the 18 inch graduation heading the columns 7 and 8 also represents the price per yard in cents, namely, eighteen cents, and the numerals 8 denote the number of inches of material which should be measured off for a given number of cents, the latter appearing in the column 7.

Example: Wanted 9 cents worth of 23 cents goods. First find the price of the goods, 23, among the inch graduations 6 and then go down the column 7 to the numeral 9, opposite which latter appears the numeral 14, which represents the number of inches of 23 cents goods which may be purchased for 9 cents. It will be noted that the highest one of the numerals in the column 7 is 10, so that for amounts over 10 cents, say 15 cents, it is necessary to first find the quantity which may be purchased for 10 cents, and then the quantity which may be purchased for 5 cents, and then add the two together. For multiples of 10, say 20 cents, find the quantity which may be purchased for 10 cents and multiply the same by 2.

The graduations 6 run from 1 to 36, so that goods having value up to 36 cents per yard may be measured. For goods having a greater value, the other side of the stick will be used. On this side of the stick are arranged columns 9 and 10 of numerals corresponding to the columns 7 and 8, and at the head of each of said pairs of columns appear the price per yard numerals 11, which latter, in this instance, are not the inch graduations, the latter appearing at the foot of the columns as indicated at 12, so that this side of the stick may also be used as a common yard measure.

I claim:

A computing yard-measure provided with graduations along one of its longitudinal edges, and transverse columns of figures arranged in pairs, each pair being headed by one of the graduations, the latter indicating linear dimensions and the price of a given quantity, and one of the members of said pairs of columns of figures representing different monetary values, the other members of said pairs of columns of figures representing quantities calculated according to the different monetary values expressed by the first-mentioned column of figures, and on the basis of the price indicated by the aforesaid graduations.

In testimony whereof I affix my signature in presence of two witnesses.

DAVID H. LAYNE.

Witnesses:
GEORGE E. CORPE,
W. D. MITCHELL.